United States Patent
Flansburg et al.

(10) Patent No.: US 9,908,147 B2
(45) Date of Patent: Mar. 6, 2018

(54) SIEVE BOX AND ADJUSTABLE NOZZLE ASSEMBLY

(71) Applicant: Bilfinger Water Technologies, Inc., New Brighton, MN (US)

(72) Inventors: Charles H. Flansburg, Andover, MN (US); Michael Richard Ekholm, Minneapolis, MN (US); Steven Douglas Dehn, Minneapolis, MN (US); Dean Brabec, North Branch, MN (US); Michael Hans Pierotti, Johnston, IA (US)

(73) Assignee: Aqseptence Group, Inc., New Brighton, MN (US)

( * ) Notice: Subject to any disclaimer, the term of this patent is extended or adjusted under 35 U.S.C. 154(b) by 83 days.

(21) Appl. No.: 14/166,983

(22) Filed: Jan. 29, 2014

(65) Prior Publication Data

US 2014/0209530 A1     Jul. 31, 2014

Related U.S. Application Data

(60) Provisional application No. 61/758,186, filed on Jan. 29, 2013.

(51) Int. Cl.
*B01D 29/07* (2006.01)
*B07B 1/00* (2006.01)
(Continued)

(52) U.S. Cl.
CPC .............. *B07B 1/00* (2013.01); *B01D 29/071* (2013.01); *B01D 29/908* (2013.01); *B07B 13/16* (2013.01); *Y10T 29/49826* (2015.01)

(58) Field of Classification Search
CPC ......... B07B 1/00; B07B 13/16; B01D 29/071; B01D 29/904; B01D 29/908;
(Continued)

(56) References Cited

U.S. PATENT DOCUMENTS 3,570,670 A * 3/1971 Endo ..................... B01D 35/20
                                                          210/112
4,113,626 A    9/1978 Detcher
(Continued)

FOREIGN PATENT DOCUMENTS

EP          0567208 A2   10/1993
WO       WO 95/33573    12/1995

OTHER PUBLICATIONS

PCT International Bureau, International Preliminary Report on Patentability dated Aug. 4, 2015 for PCT Application No. PCT/US2014/013498, 10 pages.
(Continued)

*Primary Examiner* — Patrick J Orme
(74) *Attorney, Agent, or Firm* — Patterson Thuente Pedersen, P.A.

(57) ABSTRACT

An adjustable nozzle assembly for a sieve box and a sieve box including same, including a support assembly and nozzles. A pair of elongated support members may be received through openings in support collars. Nozzles may be operatively connected to the collars. The support assembly, which may include collars and rods, are configured to provide at least one of lateral movement and rotational movement of the nozzles. At least one of the first elongated support member and the second elongated support member may be configured to move when coupled to the sieve box to adjust a spray angle of the nozzles. Pivoting of the one rod about the other rod adjusts the angle at which the nozzles are disposed. The rods may be externally threaded, and the collars may be internally threaded, such that when the rods are rotated, the collars translate laterally along the rods to move the nozzles.

25 Claims, 4 Drawing Sheets (51) Int. Cl.
*B07B 13/16* (2006.01)
*B01D 29/90* (2006.01)

(58) Field of Classification Search
CPC ............ B01D 29/6438; B01D 29/6446; B01D 29/6453; B01D 29/6461; Y10T 29/49826
See application file for complete search history.

(56) References Cited

U.S. PATENT DOCUMENTS

| 4,202,777 | A | | 5/1980 | Schall | |
|---|---|---|---|---|---|
| 4,941,971 | A | * | 7/1990 | Albright | B01D 29/114 134/152 |
| 5,135,580 | A | * | 8/1992 | Cantrell | B08B 9/0826 134/152 |
| 5,429,247 | A | * | 7/1995 | Lemay | B07B 1/55 209/17 |

OTHER PUBLICATIONS

U.S. Patent and Trademark Office, International Patent Application No. PCT/US2014/013498 International Search Report and Written Opinion dated May 9, 2014, pp. 1-10.
Search Report dated Jun. 27, 2016 for EP Application No. 14746416.8, 8 pages.
Office Action dated Jan. 10, 2017 for Chinese Application No. 201480006059X, 2 pages.
Examination Report dated Jun. 22, 2017 for Australian Application No. 2014212573, 4 pages.

* cited by examiner

SIEVE BOX AND ADJUSTABLE NOZZLE ASSEMBLY

CROSS-REFERENCE TO RELATED APPLICATION

This application claims the benefit of U.S. Patent Application No. 61/758,186, filed Jan. 29, 2013, the contents of which are hereby incorporated by reference in their entirety.

FIELD

Embodiments disclosed herein generally relate to sieve boxes, and more particularly relate to sieve boxes including adjustable nozzle assemblies.

BACKGROUND

Sieve boxes contain stationary nozzles that spray a slurry onto the surface of a sieve screen. Over time, the slurry wears down the sieve screen at the initial contact point, often near the top of the screen, thereby rendering the sieve screen so ineffective that it must be replaced. It is common practice to flip the sieve screen upside down so that the worn area is put on the bottom and an unworn area of the sieve screen is brought to the top where the slurry spraying occurs. Although this practice may double the life of the sieve screen, it does not change the wear of the sieve screen at these specific locations proximate to the top and the bottom of the screen. Also, it can be a very time consuming process to remove, re-orient, and re-attach the sieve screen to the sieve box.

Therefore, there is a need for an improved approach to extending the operating life of sieve screens.

SUMMARY

In accordance with one embodiment disclosed herein, a nozzle assembly for a sieve box is provided. The nozzle assembly includes a support assembly configured to be mounted in a sieve box, and a nozzle operatively connected to the support assembly. The support assembly is configured to allow at least one of lateral movement and rotational movement of the nozzle relative to the sieve box. Some embodiments include a first elongated support member, a second elongated support member that is substantially parallel to and in fixed spatial relation with the first elongated support member, a first support collar defining an opening through which the first elongated support member is received, and a second support collar defining an opening through which the second elongated support member is received, and a nozzle is operatively connected to the first support collar and the second support collar. The support collars and elongated support members are configured to provide at least one of lateral movement and rotational movement of the nozzle relative to the support collars and elongated support members.

In another embodiment and in combination with the above embodiment, the first elongated support member and the second elongated support member each comprise a rod. In another embodiment and in combination with the above embodiment, the first elongated support member and the second elongated support member comprise one or more plates, one or more rectangular bars, or a combination thereof In another embodiment and in combination with any of the above embodiments, at least one of the first elongated support member and the second elongated support member is configured to move when coupled to the sieve box to adjust a spray angle of the nozzle. In another embodiment and in combination with any of the above embodiments, pivoting of the second elongated support member about the first elongated support member adjusts the angle at which the nozzle is disposed. In another embodiment and in combination with any of the above embodiments, the first elongated support member and the second elongated support member are externally threaded, and the first support collar and the second support collar are internally threaded, such that when the elongated support members are rotated, the support collars translate laterally along the respective elongated support member.

In another embodiment and in combination with any of the above embodiments, the nozzle assembly may also include a plate member to which the first support collar, the second support collar, and the nozzle are mounted. In some such embodiments pivoting of the second elongated support member about the first elongated support member adjusts the angles at which the plate member and the nozzle are disposed. In another embodiment and in combination with any of the above embodiments, the first elongated support member is configured to be mounted at each end to a housing of the sieve box and free to rotate about a longitudinal axis of the first elongated support member, and the second elongated support member is configured to be mounted at each end within an opening in the housing configured to allow movement perpendicular to a longitudinal axis of the second elongated support member. In some such embodiments, the nozzle assembly also includes at least one rotatable engagement member configured to engage the housing and selectively secure the second elongated support member in a fixed position relative to the housing.

In another embodiment and in combination with any of the above embodiments, a third support collar defines an opening through which the first elongated support member is received and is spaced from the first support collar, and a fourth support collar defines an opening through which the second elongated support member is received and is spaced from the second support collar. A plurality of nozzles is mounted to a support structure to which the support collars are also mounted. The support collars and elongated support members are configured to provide at least one of lateral movement and rotational movement of the plurality of nozzles relative to the support collars and elongated support members. In some such embodiments, the support structure comprises a plate member. In other such embodiments, the support structure comprises a frame and cross-members. In some embodiments, the support assembly comprises one or more plates, one or more rectangular bars, or a combination thereof. Other support structures known in the art that facilitate similar adjustments to the nozzle orientation and position can also be applied.

In accordance with another embodiment disclosed herein, a sieve box is provided that includes a housing and one or more nozzle assemblies. A nozzle assembly includes a support assembly configured to be mounted in the sieve box and a plurality of nozzles operatively connected to the support assembly. One or more screens are disposed within the housing, and the plurality of nozzles is operable to inject a slurry onto the respective screen for separating the slurry into one or more components. The support assembly allows at least one of lateral movement and rotational movement of the plurality of nozzles relative to the sieve box.

In another embodiment and in combination with the above embodiment, the support assembly includes a first elongated support member that is coupled to the housing, a second elongated support member that is substantially parallel to and in fixed spatial relation with the first elongated support member and that is coupled to the housing, a first support collar and a second support collar that each define an opening through which the first elongated support member is received, and a third support collar and a fourth support collar that each define an opening through which the second elongated support member is received. A plurality of nozzles is operatively connected to the support collars. The support collars and elongated support members are configured to provide at least one of lateral movement and nozzle pitch, yaw, and axial (roll) rotational movement of the plurality of nozzles relative to the support collars and elongated support members. In other embodiments, nozzle adjustment can be achieved for individual and group or banked nozzles by other mounting methods known in the art.

In another embodiment and in combination with any of the above embodiments, the support assembly includes a support structure to which the support collars and the plurality of nozzles are mounted. In some such embodiments, the support structure comprises a plate member. In other such embodiments, the support structure comprises a frame and cross-members. In another embodiment and in combination with any of the above embodiments, the first elongated support member and the second elongated support member each comprise a rod. In another embodiment and in combination with any of the above embodiments, at least one of the first elongated support member and the second elongated support member are moveable within an opening in the housing to adjust a spray angle of the nozzle. In another embodiment and in combination with any of the above embodiments, pivoting of the second elongated support member about the first elongated support member adjusts the angle at which the plurality of nozzles is disposed.

In another embodiment and in combination with any of the above embodiments, the first elongated support member and the second elongated support member are externally threaded, and the first support collar and the second support collar are internally threaded, such that when the elongated support members are rotated, the support collars translate laterally along the respective elongated support member. In another embodiment and in combination with any of the above embodiments, the first elongated support member is mounted at each end to the housing and free to rotate about a longitudinal axis of the first elongated support member, and the second elongated support member is mounted at each end within an opening in the housing configured to allow movement perpendicular to a longitudinal axis of the second elongated support member. In some such embodiments, rotatable engagement members are provided that are configured to engage the housing and selectively secure the second elongated support member in a fixed position relative to the housing. Other embodiments of engagement of the adjustable nozzle system to the sieve box known in the art are applicable.

In accordance with another embodiment disclosed herein, a method of adjusting a nozzle assembly in a sieve box is provided. The sieve box includes a housing and one or more nozzle assemblies. A nozzle assembly includes a first elongated support member coupled to the housing, a second elongated support member that is substantially parallel to and in fixed spatial relation with the first elongated support member and that is coupled to the housing. A first support collar and a second support collar each define an opening through which the first elongated support member is received, and a third support collar and a fourth support collar define an opening through which the second elongated support member is received. A plurality of nozzles is operatively connected to the support collars. One or more screens are disposed within the housing, and the plurality of nozzles is operable to inject a slurry onto the respective screen for separating the slurry into one or more components. The support collars and elongated support members are configured to provide at least one of lateral movement and rotational movement of the plurality of nozzles relative to the support collars and elongated support members. The method includes, for one or more nozzle assemblies, disengaging the first elongated support member from a first, fixed position relative to the housing and the second elongated support member to make the first elongated support member slideable within openings formed in the housing at each end of the first elongated support member. The first elongated support member is moved within the openings to adjust the spray angle of the plurality of nozzles. The housing is engaged by the second elongated support member at each end of the first elongated support member to secure the second elongated support member in a second, fixed position relative to the housing and the first elongated support member. Other embodiments include alternate support mechanisms known in the art.

In some embodiments and in combination with the above embodiment of a method, in one or more nozzle assemblies the first elongated support member and the second elongated support member are externally threaded, and the first support collar and the second support collar are internally threaded. The first elongated support member is rotated about its longitudinal axis, causing the first and second support collars to translate along the first elongated member, and the second elongated support member is rotated about its longitudinal axis, causing the third and fourth support collars to translate along the second elongated support member. In some embodiments and in combination with the above embodiment of a method, the first elongated support member and the second elongated support member are slid along respective longitudinal axes to move the plurality of nozzles laterally.

BRIEF DESCRIPTION OF THE DRAWINGS

For a more complete understanding, reference should now be had to the embodiments shown in the accompanying drawings and described below. In the drawings.

DETAILED DESCRIPTION

The following detailed description refers to the accompanying drawings, which illustrate specific embodiments.

Other embodiments having different structures and operation do not depart from the scope of the present disclosure.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Figure 1:
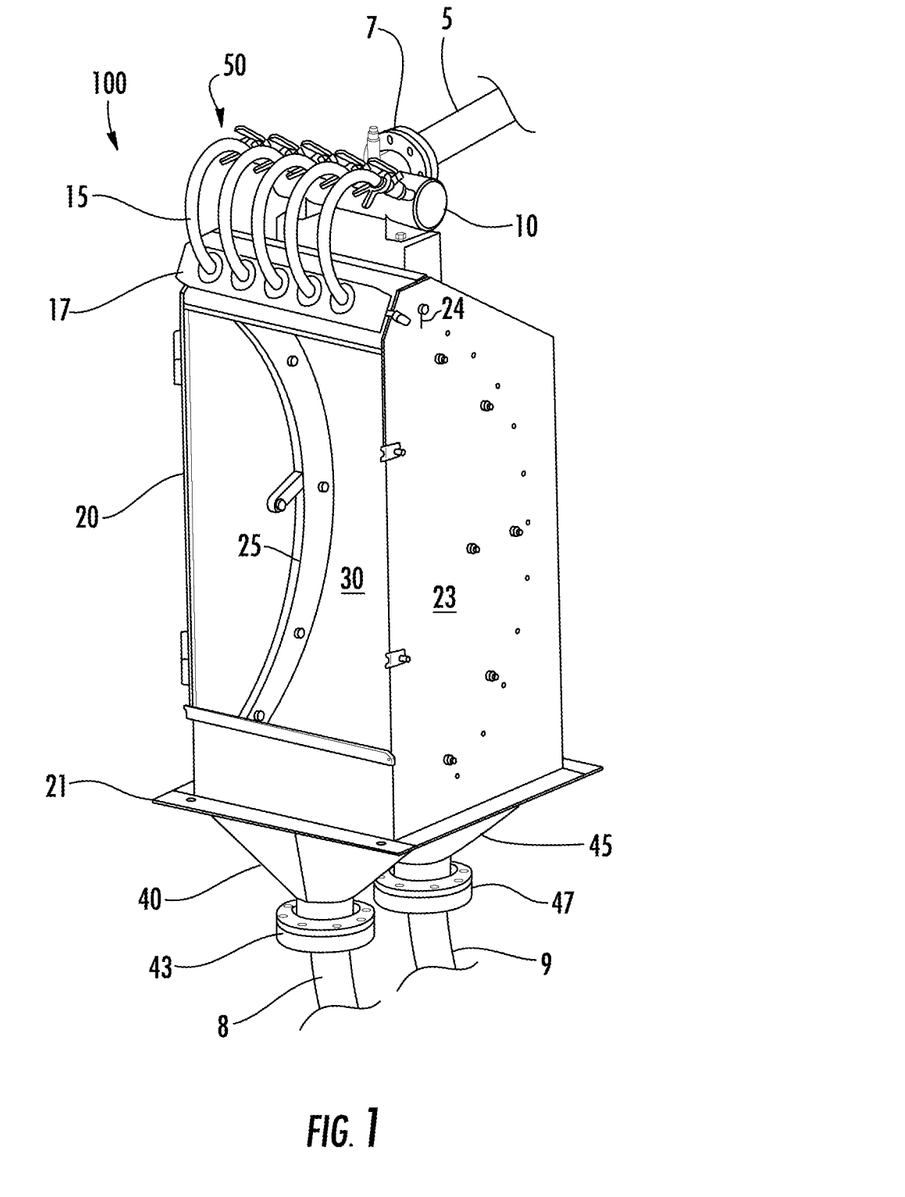
FIG. 1 is a perspective view of a sieve box assembly according to one embodiment.

Referring to the drawings, where like reference numerals refer to the same or similar parts, FIG. 1 shows a sieve box assembly 100 with a front door panel removed for clarity. The sieve box assembly 100 is configured to separate a mixture of solids and/or liquids, e.g. a slurry, into one or more components. For example, as the slurry flows through the sieve box assembly 100, the solid components of the slurry may be separated out from the liquid component of the slurry for further processing. In another example, solid components of a larger size may be separated out from solid components of a smaller size and/or from the liquid component of the slurry.

Figure 6:
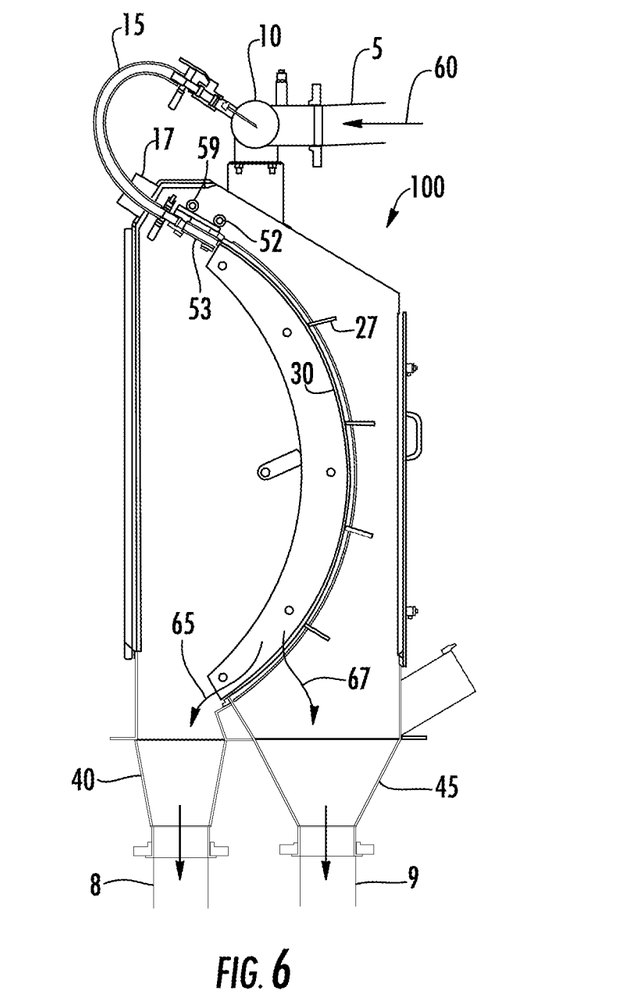
FIG. 6 is a section view of the sieve box assembly of FIG. 1, taken along line B-B of FIG. 5.

More particularly, the sieve box assembly 100 includes an inlet manifold 10, a housing 20, a screen 30, a first outlet 40, a second outlet 45, and a nozzle assembly 50. An inlet flow line 5 may be connected to the inlet manifold 10 by a sealed, flanged connection 7 for directing a slurry flow into the sieve box assembly 100. A first end of the nozzle assembly 50 is in fluid communication with the inlet manifold, and a second end of the nozzle assembly 50 is in fluid communication with the housing 20. The nozzle assembly 50 is configured to inject the slurry flow from the inlet manifold 10 into the housing 20. A support block 17 may be used to support one or more flexible flow lines 15 of the nozzle assembly 50 that may pass through the support block 17, and to secure the nozzle assembly 50 to the housing 20. The support block 17 may include a hollow interior (as illustrated in FIG. 6) such that the portion of the flexible flow lines 15 extending into the support block 17 can be horizontally and/or vertically movable for adjustment of the nozzle assembly 50 as further described herein.

The housing 20 may include any support type structure for supporting the nozzle assembly 50, the screen 30, and the first and second outlets 40, 45. A base 21 of the housing 20 may be used to secure and position the sieve box assembly 100 at floor level for ease of access. The housing 20 may also include one or more sidewalls 23 to form the support structure. As stated above, the front door panel is removed for clarity in FIGS. 1-5 to expose the internal components of the sieve box assembly 100.

The screen 30 is supported within the housing 20. A sealed, flanged connection 25 may be used to secure the screen 30 to the inner sidewall surfaces, such as the sidewall 23, of the housing 20. One or more support bars or plates 27 (illustrated in FIG. 6) may be used to further support the backside of the screen 30. Before inserting the screen 30 into the housing 20 or when positioning the screen 30 into the housing 20, the screen 30 may have a curved shape or may be curved to a shape that generally corresponds to the angle of injection of the slurry to maximize the surface area contact of the slurry with the screen 30.

The screen 30 is configured to separate the slurry into one or more components. The screen 30 may include a plurality of spaced apart, screen elements arranged to permit liquids and/or solids of a smaller size to pass through the screen 30, while preventing solids of a larger size from passing through the screen 30, thereby separating the slurry into one or more components. In one embodiment, such screens may include wire with a substantially triangular cross-section, and may include Vee-Wire® type screens (VEE-WIRE is a registered trademark of Bilfinger Water Technologies, Inc.) or wedge wire type screens. In one embodiment, such screens may include plates having perforations, slots, and/or other filter-type openings. In one embodiment, the wires and plate openings may be oriented symmetrically, asymmetrically, horizontally, vertically, tangentially, and combinations thereof. In one embodiment, the spacing and sizes of wires and plate openings vary along the lengths of such screens. In one embodiment, such screens may include one or any combination of filter wires, plates, features with perforations, features that otherwise provide a plurality of filter-type openings, and flow control vanes. Such screens may include embodiments like those disclosed in U.S. Pat. No. 6,663,774, filed on Oct. 16, 2001, specifically with respect to the filter wires 28 and the support rods 20 described therein, and embodiments like those disclosed in U.S. Pat. No. 7,425,264, filed on Jul. 18, 2005, specifically with respect to the wires 16 and the support rods 17 described therein, the contents of both of which patents are herein incorporated by reference in their entirety.

When the slurry is injected onto the screen 30, the components of the slurry that cannot flow through the screen 30 may be directed to the first outlet 40, and the components of the slurry that flow through the screen 30 may be directed to the second outlet 45. The first and second outlets 40, 45 are configured to collect and direct the separate slurry components to the two outlet flow lines 8, 9, respectively. The outlet flow lines 8, 9 may be coupled to the first and second outlets 40, 45 by sealed, flanged connections 43, 47, respectively, to direct the separate slurry components for further processing. The first and second outlets 40, 45 may be coupled to and extend below the base 21 of the housing 20.

Figure 2:
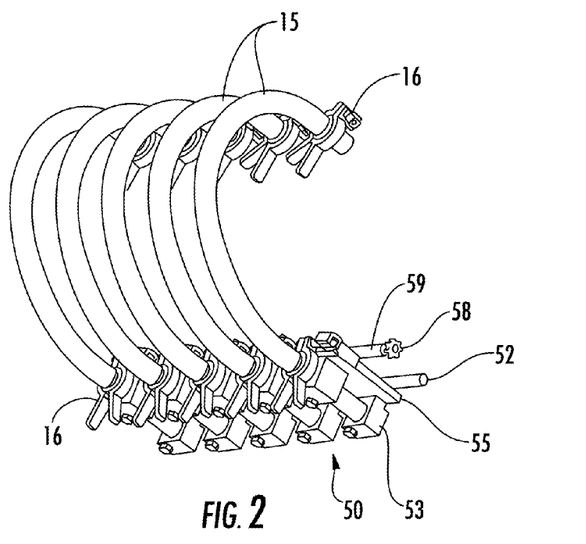
FIG. 2 is a perspective view of a nozzle assembly according to one embodiment.

FIG. 2 illustrates the nozzle assembly 50. One or more clamps 16 may be used to connect a first end of each of the flow lines 15 to the inlet manifold 10, and may be used to connect a second end of each of the flow lines 15 to one or more nozzles 53. Although five flow lines 15 and nozzles 53 are illustrated, the nozzle assembly 50 may include any number flow lines 15 and nozzles 53, including one through four, or any plurality, of flow lines 15 and nozzles 53. The clamps 16, flow lines 15, and nozzles 53 may include any conventional type of connection, flow, or injection component as known in the art. In addition, the orientation and/or arrangement of the clamps 16, flow lines 15, and nozzles 53 may include any conventional orientation and/or arrangement of a nozzle assembly for use with sieve boxes as known in the art.

Figure 3:
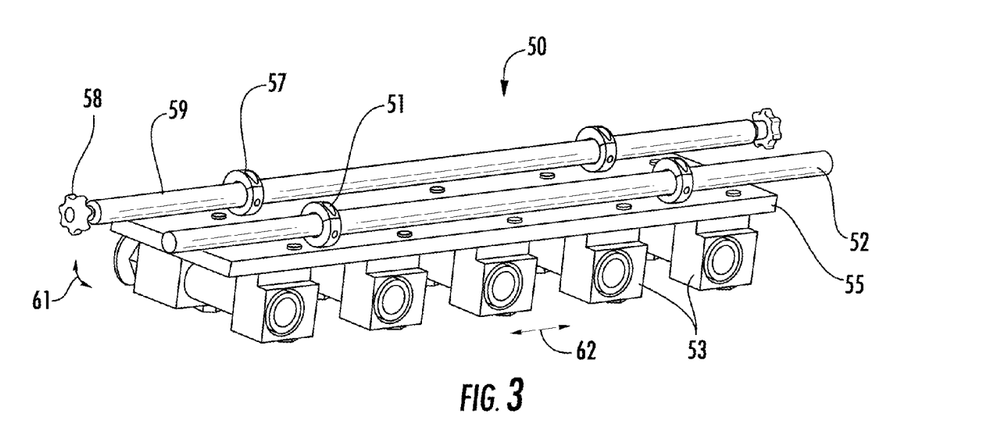
FIG. 3 is a perspective view of a portion of the nozzle assembly of FIG. 2.

FIG. 3 illustrates a support assembly that provides an adjustment mechanism of the nozzle assembly 50 according to one embodiment. A plate member or plate 55 (or other similar support structure) may be coupled to the nozzles 53. One example of an alternative to the plate 55 is a frame with cross-members. A first rod 52 or first elongated support member (or another similar elongated member, such as a rectangular bar or rail structure) and a second rod 59 or second elongated support member (or another similar elongated member, such as a rectangular bar or rail structure)

may be coupled to the plate member 52 by one or more support collars 51, 57 (or other similar support rings) respectively. The first rod 52 and the second rod 59 each have a respective longitudinal axis, and may be parallel or substantially parallel. In some embodiments a plate or elongated members may be provide while omitting collars.

The collars 51, 57 each define an opening and may have a substantially round circumference as shown or other shape at their periphery, for example, square. The collars 51, 57 may be fixed to the plate member 52, by means such as a welded connection or other mounting methods, but the collars 51, 57 may be laterally and/or rotatably movable relative to the first and second rods 52, 59. Adjustable, rotatable engagement members or knobs 58 may be threadedly coupled to opposite sides of the second rod 59 for adjusting the nozzle assembly 50 as further described below. The result in some embodiments is that the second rod 59 may pivot 61 about the first rod 52, the collars 51, 57 (with the plate 55 and nozzle 53) translate 62 along the rods 52, 59, or both, to adjust the nozzle 53 discharge or spray angle and/or lateral position. In some embodiments, one or more of nozzle pitch, yaw, and axial (roll) rotational movement of a plurality of nozzles relative to the support collars and elongated support members may be made.

Figure 4:
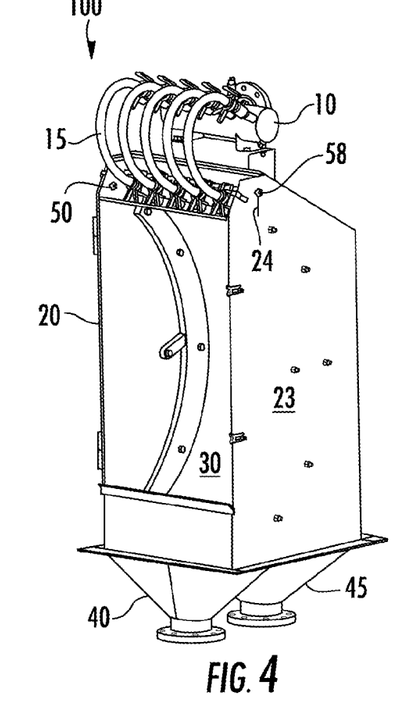
FIG. 4 is another perspective view of the sieve box assembly of FIG. 1.
Figure 5:
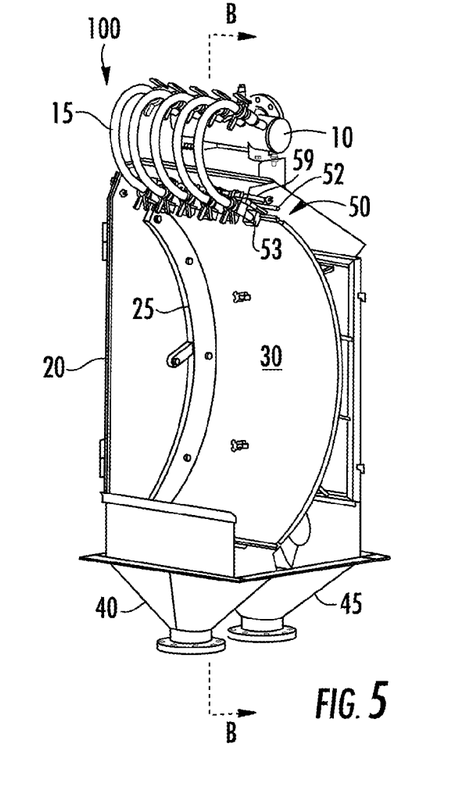
FIG. 5 is a perspective view of the sieve box assembly of FIG. 1 with a sidewall removed for clarity.

FIGS. 4 and 5 illustrate the sieve box assembly 100 with the support block 17 and the sidewall 23 removed for clarity of the nozzle assembly 50. As illustrated, the first rod 52 may be secured within the housing 20, and in particular may be coupled at opposite ends to the sidewalls of the housing 20, such as the sidewall 23. The second rod 59 may be similarly secured within the housing 20. One method to couple the first rod 52 to the sidewall 23 is to provide a flanged socket at each end of the first rod 52 that is attached to the sidewall 23 with a first rod end received in the socket. However, the ends of the second rod 59 and/or the adjustable knobs 58 may extend through slots 24 (or other similar openings) formed in the sidewalls 23 of the housing 20 such that the adjustable knobs 58 are accessible from the exterior of the housing 20.

Referring to FIGS. 4 and 5, one of the adjustable knobs 58 is disposed external to the sidewall 23 such that the adjustable knobs 58 and the second rod 59 can be moved within a slot 24 (or other similar opening) formed in the sidewall 23. A corresponding slot and adjustable knob may be provided on the sidewall opposite to sidewall 23. Although the slot 24 is represented in FIGS. 1 and 4 as straight and vertical, depending on the design desired, the slot 24 may be other than straight, such as curved, and other than vertical. To adjust the angle that the nozzle assembly 50 sprays the slurry onto the screen 30, the second rod 59 may be moved within the slot 24, which will move the plate member 55 and thus the nozzles 53 connected thereto. The collars 51, 57 that are secured to the plate member 55 may rotate about the first and second rods 52, 59 to permit the adjustment of the nozzle assembly 50 relative to the rods and/or the housing 20.

Since the adjustable knobs 58 are threaded into the second rod 59, the adjustable knobs 58 may be tightened to secure the second rod 59 in a desired position within the slot 24 and relative to the housing 20 by rotating the knobs 58 to advance the knobs 58 toward and into engagement with the sidewalls of the housing 20. The knobs 58 may be rotated in an opposite direction to loosen the engagement with the sidewalls of the housing 20, and may be used to re-position and re-secure the second rod 59 in another position within the slot 24. Other manual and/or automated drive type mechanisms may be used to adjust the angular position of the nozzle assembly 50. In this manner, the nozzle assembly 50 may be adjusted to position the slurry spray angle at an angle relative to the screen 30 to maximize operating efficiency, e.g. the efficiency of the screen 30 filtering and/or separating the components of the slurry. In one embodiment, the nozzle assembly 50 may be operable to adjust the slurry spray at an angle substantially tangent to the surface of the screen 30. In one embodiment, the nozzle assembly 50 may be adjusted to spray the slurry onto the screen 30 to maximize fluid shear of the slurry as is flows over the screen 30.

Alternatively or in addition to the angular adjustment, the nozzle assembly 50 may be adjusted and moved laterally, which often means horizontally, relative to the screen 30. The nozzle assembly 50 may be repositioned along the width of the screen 30 so that the slurry spray does not wear the screen 30 in any specific horizontal location. In particular, the nozzles 53 may be moved collectively along the length of the first and second rods 52, 59 via the collars 51, 57 and the plate member 55. In one embodiment, the nozzle assembly 50 may be manually repositioned by an operator. In one embodiment, a screw-drive type mechanism (such as with an acme-type thread) may be used to adjust the lateral position of the nozzle assembly 50. Other manual and/or automated drive type mechanisms may be used to adjust the position of the nozzle assembly 50. In one example, the first rod 52 may include external threads that engage internal threads of the collars 51, such that rotation of the first rod 52 may drive the collars 51 and thus the plate member 55 and the nozzles 53 laterally relative to the screen 30. The ends of the first rod 52 may extend outside of the housing 20 so that the nozzle assembly 50 can be adjusted laterally from the exterior of the housing 20. In this manner, the nozzle assembly 50 may be operable to adjust the location that the slurry is sprayed onto the screen 30 to prevent wear of the screen 30 in one specific location and to increase the screen 30 operating life, without having to remove and reorient the screen 30.

In one embodiment, angular adjustment and/or lateral position of the nozzle assembly 50 may be actuated using an actuator disposed external to the housing 20. In one embodiment, angular adjustment and/or lateral position of the nozzle assembly 50 may be operable using an automated process.

FIG. 6 illustrates a section view along line B-B as shown in FIG. 5. As illustrated, a slurry 60 flows into the inlet manifold 10 and then through at least one of the flow lines 15 of the nozzle assembly 50. The slurry 60 is injected onto the screen 30 to separate a first component 65 and a second component 67 of the slurry 60. The first component 65 may include one or more solid materials having a particle size incapable of passing through the screen 30. The first component 65 is directed over or flows along the surface of the screen 30 such that the injection velocity and/or gravity forces the first component 65 to the first outlet 40. The second component 67 may include one or more fluids or solid materials having a particle size capable of passing through the screen 30. The second component 67 is directed over or flows through the screen 30 such that the injection velocity and/or gravity forces the second component 67 to the second outlet 45. The sieve box assembly 100 can be used with any type or composition of slurry for separating the slurry into one or more components. In one embodiment, the housing 20 may be partially or fully sealed, and may be partially or fully pressurized with a gas, such as carbon dioxide, to assist with the flow of the slurry through the housing 20 to the first and second outlets 40, 45.

In some embodiments, one or more sieve box assemblies 100 may be coupled to or positioned adjacent to one or more other sieve box assemblies 100 to form a bank or group of sieve box assemblies. In some embodiments, the sieve box assembly 100 may include one or more screens 30 positioned within a single, unitary housing 20 or within a plurality of housings 20 coupled together and/or separated by one or more sidewalls 23. In some embodiments, the sieve box assembly 100 may include one or more nozzle assemblies 50 and/or one or more inlet manifolds 10 for distributing slurry flow to the one or more nozzle assemblies 50. For example, a sieve box 100 may have more than one screen 30 in it, and each screen 30 could have one or more nozzle assemblies 50 associated with it. In some embodiments, the sieve box assembly 100 may include one or more first and/or second outlets 40, 45. Embodiments of the sieve box assembly 100 and nozzle assembly 50 include one or more combinations, in whole or part, of the embodiments described herein.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein. While the foregoing is directed to embodiments of a sieve box, an adjustable nozzle assembly, and components thereof, other and further embodiments may be devised without departing from the basic scope thereof, and the scope thereof is determined by the claims that follow.

What is claimed is:

1. A nozzle assembly for a sieve box, comprising:
   a support assembly configured to be mounted in a sieve box, the support assembly comprising:
   a support structure having a first side and an opposed second side;
   a first elongated support member rotatably coupled to the first side of the support structure and defining a first longitudinal axis; and
   a second elongated support member rotatably coupled to the first side of the support structure and defining a second longitudinal axis, the second elongated support member being configured to rotate about at least the first longitudinal axis; and
   a nozzle fixedly coupled to the second side of the support structure,
   wherein the support assembly is configured to enable the support structure to pivot relative to the sieve box, thereby enabling at least one of lateral movement and rotational movement of the nozzle relative to the sieve box.

2. The nozzle assembly of claim 1, wherein the support assembly further comprises:
   a first support collar mounted to the first side defining an opening through which the first elongated support member is received; and
   a second support collar mounted to the first side defining an opening through which the second elongated support member is received,
   wherein the second elongated support member is substantially parallel to and in fixed spatial relation with the first elongated support member,
   wherein the support collars and elongated support members are configured to provide at least one of lateral movement and rotational movement of the nozzle relative to the support collars and elongated support members.

3. The nozzle assembly of claim 2, wherein the first elongated support member and the second elongated support member each comprise a rod.

4. The nozzle assembly of claim 2, wherein at least one of the first elongated support member and the second elongated support member is configured to move when coupled to the sieve box to adjust a spray angle of the nozzle.

5. The nozzle assembly of claim 2, wherein rotating the second elongated support member about the first longitudinal axis of the first elongated support member adjusts the angle at which the nozzle is disposed.

6. The nozzle assembly of claim 2, wherein the first elongated support member and the second elongated support member are externally threaded, and the first support collar and the second support collar are internally threaded, such that when the first elongated support member is rotated about the first longitudinal axis and/or the second elongate member is rotated about the second longitudinal axis, the support collars translate laterally along the respective elongated support member.

7. The nozzle assembly of claim 2, wherein the support structure comprises a plate member.

8. The nozzle assembly of claim 7, wherein:
   rotating the second elongated support member about the first longitudinal axis of the first elongated support member adjusts the angles at which the plate member and the nozzle are disposed.

9. The nozzle assembly of claim 2, wherein the first elongated support member is configured to be mounted at each end to a housing of the sieve box and free to rotate about the first longitudinal axis of the first elongated support member, and the second elongated support member is configured to be mounted at each end within an opening in the housing configured to allow movement perpendicular to the second longitudinal axis of the second elongated support member.

10. The nozzle assembly of claim 9, further comprising at least one rotatable engagement member configured to engage the housing and selectively secure the second elongated support member in a fixed position relative to the housing.

11. The nozzle assembly of claim 2, further comprising:
    a third support collar defining an opening through which the first elongated support member is received, the third support collar spaced from the first support collar on the first side;
    a fourth support collar defining an opening through which the second elongated support member is received, the fourth support collar spaced from the second support collar on the first side; and
    a plurality of nozzles mounted on the second side; and
    wherein the support collars and elongated support members are configured to provide at least one of lateral movement and rotational movement of the plurality of nozzles relative to the support collars and elongated support members.

12. The nozzle assembly of claim 11, wherein the support structure comprises a plate member.

13. The nozzle assembly of claim 11, wherein the first elongated support member is rotatably coupled to the sieve box, and the second elongated support member is rotatably and slidably coupled to the sieve box, such that sliding the second elongated member relative to the sieve box causes the second elongated support member to rotate about at least the first longitudinal axis of the first elongated support member.

14. The nozzle assembly of claim 1, wherein the support structure comprises one or more plates, one or more rectangular bars, or a combination thereof.

15. A sieve box comprising:
a housing;
one or more nozzle assemblies each comprising:
a support assembly configured to be mounted in the sieve box, the support assembly comprising:
a plate member having a first side and an opposed second side;
a first elongated support member mounted to the first side and rotatably coupled to the housing and defining a first longitudinal axis; and
a second elongated support member mounted to the first side and rotatably and slidably coupled to the housing defining a second longitudinal axis, such that sliding the second elongated member relative to the housing causes the second elongated support member to rotate about at least the first longitudinal axis; and
a plurality of nozzles operatively connected to the opposed second side,
one or more screens disposed within the housing, wherein the plurality of nozzles is operable to inject a slurry onto the respective screen for separating the slurry into one or more components,
wherein the support assembly allows at least one of lateral movement and rotational movement of the plurality of nozzles relative to the sieve box.

16. The sieve box of claim 15, wherein the support assembly further comprises:
a first support collar and a second support collar each defining an opening through which the first elongated support member is received, the first and second support collar mounted to the first side; and
a third support collar and a fourth support collar defining an opening through which the second elongated support member is received, the third and fourth support collar mounted to the first side,
wherein the second elongated support member is substantially parallel to and in fixed spatial relation with the first elongated support member,
and
wherein the support collars and elongated support members allow at least one of lateral movement and rotational movement of the plurality of nozzles relative to the support collars and elongated support members.

17. The sieve box of claim 16, wherein the first elongated support member and the second elongated support member each comprise a rod.

18. The sieve box of claim 16, wherein at least one of the first elongated support member and the second elongated support member are moveable within an opening in the housing to adjust a spray angle of the plurality of nozzles.

19. The sieve box of claim 16, wherein rotating the second elongated support member about the first longitudinal axis of the first elongated support member adjusts the angle at which the plurality of nozzles are disposed.

20. The sieve box of claim 16, wherein the first elongated support member and the second elongated support member are externally threaded, and the first support collar and the third support collar are internally threaded, such that when the first elongated support member is rotated about the first longitudinal axis and/or the second elongate member is rotated about the second longitudinal axis, the support collars translate laterally along the respective elongated support member.

21. The sieve box of claim 16, wherein the first elongated support member is mounted at each end to the housing and free to rotate about the first longitudinal axis of the first elongated support member, and the second elongated support member is mounted at each end within an opening in the housing configured to allow movement perpendicular to the second longitudinal axis of the second elongated support member.

22. The sieve box of claim 21, further comprising rotatable engagement members configured to engage the housing and selectively secure the second elongated support member in a fixed position relative to the housing.

23. A method of adjusting a nozzle assembly in a sieve box, the sieve box comprising:
a housing;
one or more nozzle assemblies each comprising:
a plate member having a first side and an opposed second side;
a first elongated support member mounted to the first side and rotatably coupled to the housing and defining a first longitudinal axis;
a second elongated support member mounted to the first side and that is substantially parallel to and in fixed spatial relation with the first elongated support member, the second elongated support member rotatably and slidably coupled to the housing and defining a second longitudinal axis, such that sliding the second elongated member relative to the housing causes the second elongated support member to rotate about at least the first longitudinal axis;
first support collar and a second support collar each defining an opening through which the first elongated support member is received;
a third support collar and a fourth support collar defining an opening through which the second elongated support member is received; and
a plurality of nozzles mounted to the opposed second side and operatively connected to the support collars;
one or more screens disposed within the housing, wherein the plurality of nozzles is operable to inject a slurry onto the one or more screens for separating the slurry into one or more components,
the method comprising, for one or more nozzle assemblies:
disengaging the second elongated support member from a first, fixed position relative to the housing and the first elongated support member to make the second elongated support member slidably movable within openings formed in the housing at each end of the second elongated support member;
sliding the second elongated support member within the openings to adjust the spray angle of the plurality of nozzles, wherein sliding the second elongated support member comprises rotating the second elongated support member about the first longitudinal axis of the first elongated support member to adjust the angle at which the plurality of nozzles are disposed; and
engaging the housing with the second elongated support member at each end of the second elongated support member to secure the second elongated support member in a second, fixed position relative to the housing and the first elongated support member.

24. The method of claim 23, wherein the first elongated support member and the second elongated support member are externally threaded, and the first support collar and the third support collar are internally threaded, and further comprising, for one or more nozzle assemblies:

rotating the first elongated support member about the first longitudinal axis, causing the first and second support collars to translate along the first elongated member; and rotating the second elongated support member about the second longitudinal axis, causing the third and fourth support collars to translate along the second elongated support member.

25. The method of claim 23, further comprising:

sliding the first elongated support member and the second elongated support member along respective longitudinal axes to move the plurality of nozzles laterally.

\* \* \* \* \*